July 30, 1946.    R. E. TROELL    2,405,073
PHASE COMPARATOR
Filed Oct. 28, 1943
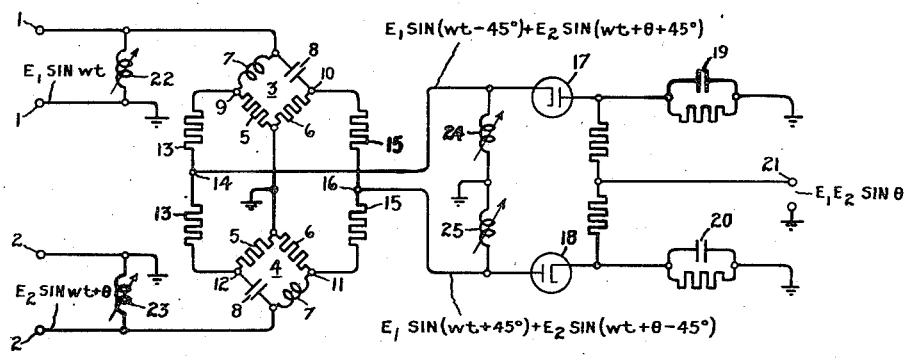
Inventor:
Roy E. Troell,
by Harry E. Dunham
His Attorney.

Patented July 30, 1946

2,405,073

UNITED STATES PATENT OFFICE 2,405,073

PHASE COMPARATOR

Roy E. Troell, Schenectady, N. Y., assignor to General Electric Company, a corporation of New York Application October 28, 1943, Serial No. 507,952

3 Claims. (Cl. 172—245)

The present invention relates to a phase comparator adapted for use at high frequencies.

The object of my invention is to provide a phase comparator in which the input and measuring circuits can be grounded without impairing the accuracy and in which the need for a 90 degree phase shifting network is eliminated.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which the single figure is a diagram of a phase comparator embodying my invention.

Referring to the drawing there is shown a phase comparator having pairs of input terminals 1 and 2 to which are applied the voltages $E_1 \sin wt$ and $E_2 \sin (wt+\theta)$ to be compared in phase. One of each pair of terminals is grounded and across the respective pairs of terminals are connected a bridge circuit 3, 4 each of which comprises equal resistances 5, 6 and inductances 7 and condensers 8 having reactances at the frequency of the voltages to be compared equal in magnitude to the resistances. At the terminals 1 and 2 the bridge circuits are parallel tuned at the operating frequency. Because the resistances are equal to the inductive and capacitive reactances, the voltages at the intermediate bridge terminals 9, 10 and 11, 12 respectively lag and lead the voltages applied to the terminals 1 and 2 by 45 degrees. By means of decoupling resistances 13 the lagging voltage from terminal 9 is added to the leading voltage from terminal 12 producing a resultant voltage at the center tap 14 proportional to $E_1 \sin (wt-45°) + E_2 \sin (wt+\theta+45°)$.

Similarly by decoupling resistances 15 the leading voltage from terminal 10 is added to the lagging voltage from terminal 11 to produce at the center tap 16 a resultant voltage proportional to $E_1 \sin (wt+45°) + E_2 \sin (wt+\theta-45°)$. The voltages at terminals 14 and 16 are respectively fed through square law detectors, such as diodes 17 and 18, causing the charging of grounded condensers 19 and 20 in accordance with the squares of the resultant voltages. Because the diodes are connected in opposite polarity, the condensers are charged to voltages of opposite polarity and the addition of the condenser voltages at terminal 21 is in effect a subtraction which results in a D.-C. voltage above ground proportional to $E_1 E_2 \sin \theta$ at terminal 21. There are also A.-C. voltages which do not affect a D.-C. voltmeter. The voltage at terminal 21, when measured by a D.-C. voltmeter, will accordingly change sign as the relative phase displacement ($\theta$) goes from positive to negative so the operator can tell whether a voltage is lagging or leading.

The phase comparison circuit, because of the symmetry in the input and measuring circuits which permits grounding along the axis of symmetry, is suitable for use at high frequencies, e. g. 30 mc. The parallel tuned bridge circuits are an improvement over separate 90 degree phase shifting networks. If there is any stray capacity such as that resulting from the leads or the diodes 17, 18, it can be neutralized by inductances 22, 23 connected across the terminals 1, 2 and inductances 24, 25 connected between ground and the terminals 14, 16.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. In a phase comparator, grounded input circuits for the voltages to be compared in phase, lagging and leading phase shifting networks across each of the input circuits, center tapped decoupling impedances respectively cross connecting the lagging phase shift voltage of one and the other input circuit to the leading phase shift voltage of said other and one input circuit, square law detectors for the voltages at said center taps, and means for subtracting the detected voltages.

2. In a phase comparator, input circuits for the voltage to be compared each connected to diametral terminals of a parallel tuned bridge circuit, intermediate terminals of said bridge circuits having potentials leading and lagging with respect to the input voltages, center tapped decoupling impedances respectively cross connecting said leading potential of one and the other of said bridge circuits with said lagging potential of said other and one bridge circuit, square law detectors for the resultant voltages at said center taps, and means for subtracting the detected voltages.

3. In a phase comparator, input circuits for the voltages to be compared each connected to diametral terminals of a parallel tuned bridge circuit, said bridge circuits having arms of equal impedances consisting respectively of resistances and reactances whereby at the intermediate bridge terminals the input voltages are shifted in phase 45° leading and lagging, means for respectively adding the leading voltage of one and the other bridge circuit to the lagging voltage of said other and one bridge circuit to obtain resultant voltages, square law detectors for the resultant voltages, and means for subtracting the detected voltages.

ROY E. TROELL.